Frank Delfino
Robert E. Pool
INVENTORS

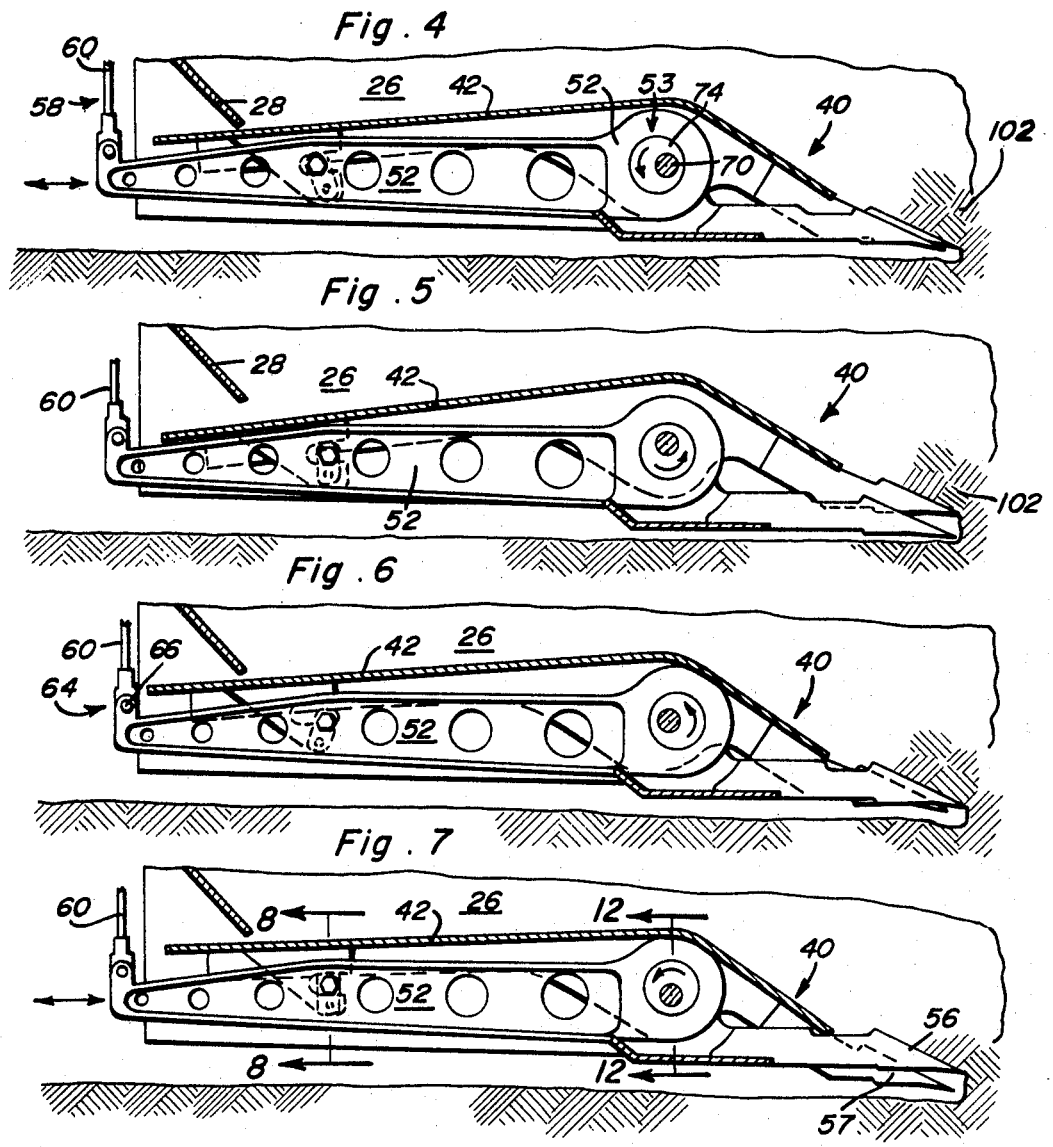

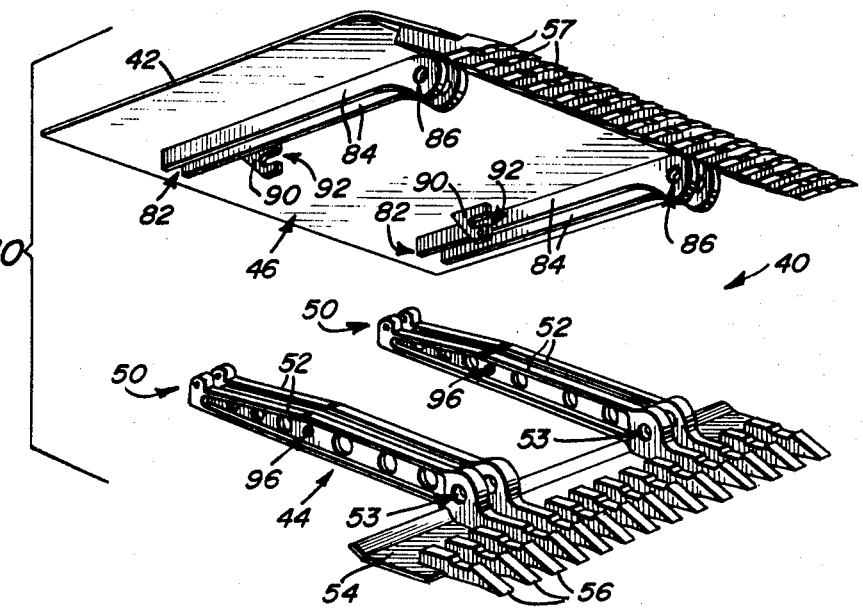
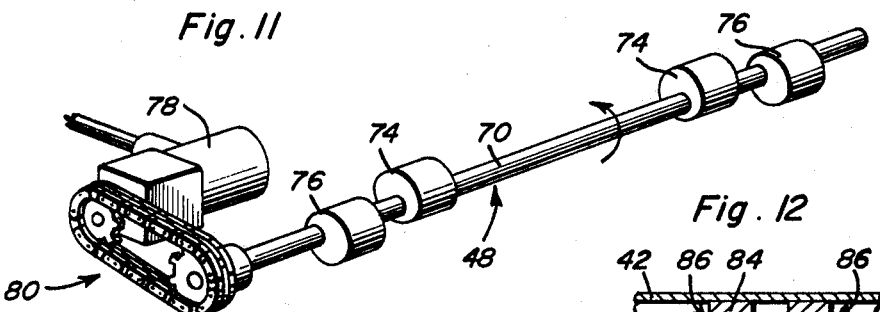
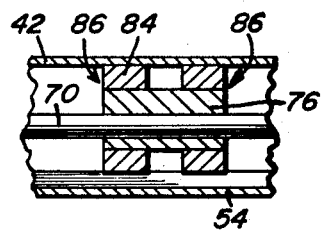
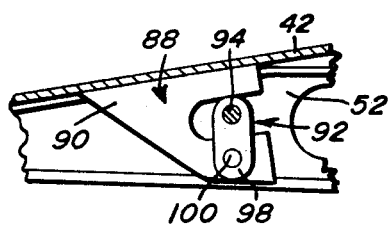
Frank Delfino
Robert E. Pool
INVENTORS

United States Patent Office 3,475,841
Patented Nov. 4, 1969

3,475,841
**SCRAPER WITH ECCENTRICALLY
DRIVEN TEETH**
Frank Delfino and Robert E. Pool, Bakersfield, Calif.;
said Delfino assignor of fifty percent and said Pool assignor of five percent to Delfino Bros., Bakersfield,
Calif., a partnership
Filed Sept. 14, 1967, Ser. No. 667,709
Int. Cl. E02f *3/62, 3/76;* E21c *47/00*
U.S. Cl. 37—141                                2 Claims

ABSTRACT OF THE DISCLOSURE

An earth working apparatus supported by a portable frame for scraping and loading earth and provided with a plurality of scraper blades which are power driven in a generally circular path relative to the frame of the device. The circular path of the scraper blades assists the forward draft motion of the scraping device in dislodging and lifting earth into the device due to the continuous cyclic movement of the scraper blades lifting and urging the earth rearwardly. The scraper blades are carried on a plurality of support members at least one of which is pivotally mounted relative to the portable frame of the scraper and the remaining scraper blade carriers preferably being pivotally secured to the carrier pivotally mounted to the scraper frame. The scraper blade carrying members are driven in an eccentric circular path, independently of the movement of the scraping device, by power driven cam means rotatably journaled to the frame of the scraper. In addition, the load bed of the scraper device may be an integral part of one of the scraper blade support members, and preferably one of the scraper blade support members not directly pivotally connected to the portable frame, whereby earth being scraped up onto the load bed will be continuously urged rearwardly along the load bed so as to significantly reduce the power required to scrape and load earth.

The present invention relates to earth working devices provided with a drive means for an earth working tool and more particularly to excavating scoops. More specifically, the present invention relates to excavating scrapers provided with a drive means for driving scraping blades in an eccentric path about a horizontal axis normal to the line of draft of the earth working device.

It is an object of the present invention to provide a novel construction for earth moving equipment provided with cutting blades or fingers.

Another object of the present invention is to provide a novel construction for earth moving equipment wherein the cutting blades or fingers thereof are power driven in an eccentric path about an axis generally normal to the line of travel of the earth working device.

A further object of the present invention is to provide a novel construction for earth working apparatuses whereby the provision of non-rotary eccentrically driven scraper blades or fingers significantly reduces the power required to scrape and subsequently load earth into earth working apparatuses.

Still another object of the present invention is to provide a novel construction for a self-loading earth scraper including power driven scraping fingers which are non-rotatably driven in an eccentric path about a horizontal axis generally normal to the line of travel of the scraper and wherein the eccentric motion of the scraping elements continuously urges the earth up into a collection bowl.

Still another object of the present invention is to provide a novel construction for a self-loading earth scraper wherein the load supporting bed of the scraper is continuously driven, during loading of the scraper, in an eccentric path about a horizontal axis generally normal to the line of travel of the scraper whereby earth deposited adjacent the leading edge of the load bed by an associated scraping means is continuously urged rearwardly along the load bed so as to significantly reduce the power required to pull the scraper along the earth being worked.

Still a further object of the present invention is to provide a novel construction for an earth working apparatus wherein pluralities of scraping fingers are power driven along eccentric paths which are generally out of phase.

These together with other objects and advantages which will become subsequently apparent reside in the details of construction and operation as more fully hereinafter described and claimed, reference being had to the accompanying drawings forming a part hereof, wherein like numerals refer to like parts throughout, and in which::

FIGURES 4, 5, 6 and 7 are enlarged fragmentary vertical longitudinal cross-sectional views of the exemplary apparatus of FIGURE 1 illustrating the sequential position of earth scraping fingers as they are driven in an eccentric path;

FIGURE 8 is an enlarged fragmentary vertical transverse cross-sectional detail taken substantially along the plane of the line 8—8 of FIGURE 7 and illustrating details of the manner in which scraper finger supporting members are pivotally interconnected;

FIGURE 9 is an enlarged side elevational view of the pivot means illustrated in FIGURE 8;

FIGURE 10 is an enlarged partially exploded perspective view of upper and lower scraper finger supporting members illustrated in assembled relation in FIGURES 1–9;

FIGURE 11 is a perspective view of an exemplary power driven cam means adapted to be journaled to the frame of the earth scraper in operatively assembled relation to the scraper finger supporting assemblies of FIGURE 10 so as to impart eccentric motion thereto; and FIGURE 12 is an enlarged fragmentary cross-sectional view taken substantially along the plane of the line 8—8 of FIGURE 7 and illustrating details of the journaling of the cam means relative to the scraper finger supporting members.

Figure 1:
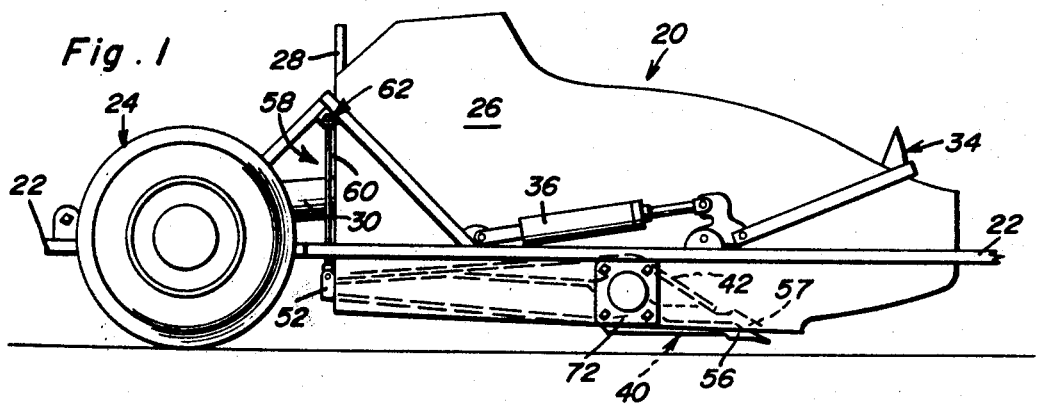
FIGURE 1 is a side elevational view of an exemplary form of earth working apparatus provided with an exemplary embodiment of earth scraping blades or fingers constructed and driven in accordance with the present invention.
Figure 2:
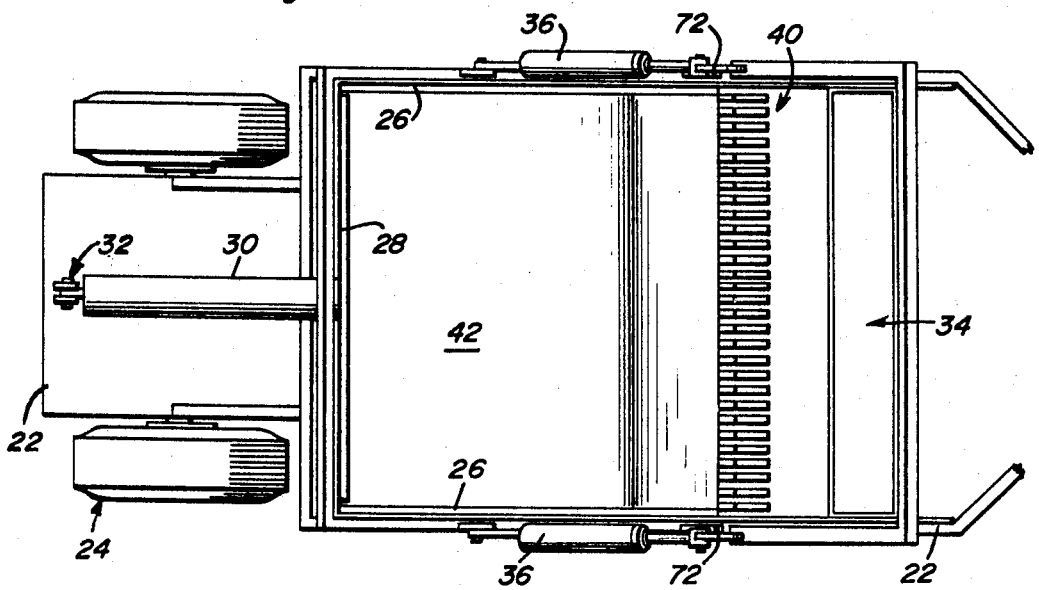
FIGURE 2 is a top plan view of the self-loading scraper of FIGURE 1.

Referring now to the drawings in details, and FIGURES 1 and 2 in particular, it will be seen that the invention has been illustrated in conjunction with an exemplary earth working apparatus comprising a self-loading portable earth scraper indicated generally at 20 of the type conventionally drawn by a prime mover such as tractor, bulldozer, etc. The self-loading scraper 20 is provided with a frame means 22 to which is journaled supporting wheel means 24 and a drawbar hitch, not shown. The frame means 22 supports a pair of vertical side plates 26 which define the sides of an earth receiving compartment.

The rear wall of the load receiving compartment is defined by an upstanding plate 28 secured to the piston of a double-acting fluid operated cylinder 30 having one end secured as at 32 to the frame 22 of the self-loading scraper 20 whereby earth collected within the load receiving area of the scraper 20 may be unloaded by actuating the cylinder means 30 to urge the plate 28 forwardly to dislodge the earth collected in the load receiving area. In addition, the self-loading scraper 20 includes a pivotally mounted front gate as indicated at 34 operated by a pair of double-acting fluid operated cylinders 36. It will be appreciated that the above described structure is that generally conventionally found in self-loading earth scrapers.

The novel aspect of the earth working apparatus comprising the exemplary self-loading earth scraper 20 illustrated resides in the scraper blade means indicated generally at 40, which means in the self-loading scraper embodiment 20 illustrated also includes a bottom wall member 42 which comprises the load receiving bed of the load receiving compartment partially defined by the upstanding walls 26 and the pusher plate 28. As will become more apparent hereinafter, the load supporting member 42 is not directly secured to the frame 22 of the scraper 20.

The scraper blade means 40, as will probably be best appreciated from a consideration of FIGURES 11 and 10, basically comprises three sub-assemblies, namely, a lower scraper finger supporting assembly 44, an upper scraper finger supporting assembly 46 and a power driven scraper finger drive means 48 adapted to drive the scraper finger supporting assemblies 44 and 46 in generally eccentric paths. The scraper finger supporting assembly 44 includes two pairs of longitudinally extending beams 50 each consisting of a pair of beams 52 such as I-shaped cross-sectional configuration and provided adjacent their forwardly disposed lower edges with a scraper finger supporting plate 54 such as provided with a plurality of scraper fingers 56 removably or fixedly secured thereto by suitable means, not shown. In addition, if desired, the forwardly disposed portions of the beams 52 may also be formed in the configuration of scraping fingers 56. In addition, it will be understood that the scraper blade means 40 may be provided with scraping fingers of configurations, other than that illustrated. The paired beams 52 are mounted to the frame means 22 for limited longitudinally swingable and transversely pivotal movement with respect thereto by a swinging pivot means indicated at 58 provided for each beam means 50 and which includes a pair of hangers 60 each pivotally secured as at 62 to the frame 22 by a suitable pivot bolt journaled in a hanger secured to the frame 22. The lower ends of the hangers 60 are pivotally connected to the rearwardly disposed ends of the beam means 50 as at 64 by suitable pivot bolts 66 whereby, as indicated hereinabove, the rearwardly disposed end of the lower scraper finger supporting or carrying assembly 44 is longitudinally slidably secured relative to the frame 22 of the self-loading scraper 20.

Figure 3:
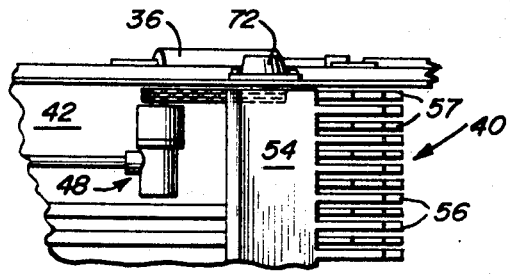
FIGURE 3 is a fragmentary bottom plan view showing certain details of the scraping finger drive means.

The forwardly disposed, i.e., scraping finger, end portion of the assembly 44 is supported for eccentric movement relative to the frame 22 of the scraper 20 by the power driven cam means 48. In this regard, it will be seen that the power means 48 includes a cam shaft 70 of sufficient length to extend the entire width of the load receiving area of the scraper 20 so as to be rotatably journaled relative to the frame 22 of the scraper 20 by means of diametrically opposed journals 72, one of which may be clearly seen in FIGURE 1, which journals 72 are preferably fixedly or removably secured to the outside surfaces of the side plates 26. The cam shaft 70 is provided with two pairs of cam lobes 74 and 76 respectively and wherein each pair of lobes are identical and in phase with one another but disposed out of phase with the lobes of the other pair. The power driven cam means 48 is further provided with a drive motor means 78, such as comprising a fluid or electrically driven motor, for example, deriving its source of power from the prime mover for example, and positively driving the cam shaft 70 through a suitable drive sprocket and drive chain means 80, the operative positioning of which on the underside of the scraper 20 will be best appreciated from a consideration of FIGURE 3. The cam lobes 74, which are fixedly secured to the shaft 70, are operatively received within cam follower journals indicated at 53 and provided in forwardly disposed enlarged portions of the beam members 52. Thus, rotation of the cam shaft 70 by the drive motor 78 causes the lower scraper finger supporting assembly 44 to move eccentrically about the axis of the shaft 70 under the influence of the cam lobes 74. As will become readily apparent hereinafter, the shaft 70 must rotate in a counterclockwise direction, as seen in FIGURES 4–7 in order for the scraper finger supporting assemblies 44 and 46 to cooperate in scraping and loading earth in the manner intended. Furthermore, it will now be appreciated that the lower scraper finger supporting assembly 44 is movably supported relative to the frame 22 of the scraper 20 by the cam lobes 74 and the pivotally secured hangers 60.

Referring now further to the upper scraper finger supporting assembly 46, which in the embodiment shown also includes the load supporting bed 42, it will be seen that the underside of the load supporting bed 42 is provided with longitudinally extending reinforcing beam means indicated at 82 each comprising a pair of beams 84 provided with enlarged portions adjacent their forward ends which are in turn provided with cam journal means 86 adapted to receive the cams 76, which like the cams 74 are non-rotatably secured to the cam shaft 70.

From a consideration of FIGURE 11 it will be seen that the upper scraper finger carrying assembly 46 is provided with a plurality of scraper fingers 57 rigidly secured to the underside of the downwardly inclined leading edge portion of the load supporting member 42. Thus it will be appreciated that the forward end of the upper scraper finger carrying assembly 46 is mounted for eccentric movement relative to both the frame 22 and the lower scraper finger carrying assembly 44. The rearwardly disposed end of the upper scraper finger carrying assembly 46 is supported from the lower finger carrying assembly 44 by virtue of pivotal link means 88 and comprising a pair of slotted pivot hangers 90 secured to the underside of the load carrying member 42 and provided with forwardly opening slots 92. The slots 92 permit the hanger 90 to move generally longitudinally relative to the pivot shaft 94 carried by each pair of beams 52 in suitably provided apertures 96 adjacent but spaced from the rearwardly disposed end of the beams 52. The pivot shaft 94 pivotally supports a pair of hanger straps 98 which pivotally support the pivot hanger 90 by means of a pivot bolt 100 passing through suitable apertures provided in the hanger straps 98 and the pivot hanger 90. Thus, it will be appreciated that the upper scraper finger carrying assembly 46 is mounted for eccentric movement about the shaft 70 by means of the cams 76 being received within the cam journal means 86, seen best in FIGURE 12, and somewhat eccentric but generally longitudinal movement relative to the beam means 50 of the lower scraper finger carrying assembly 44.

Referring now to the operation of the self-loading scraper 20 and actuation of the scraper blade or finger means 40 therein, and as will be best appreciated from a further consideration of the sequential views illustrated in FIGURES 4–7, when the self-loading scraper 20 is drawn along a surface from which earth or the like, is to be scraped and loaded into the load carrying compartment of the scraper 20, the hitch means of the prime mover is lowered to permit the scraping fingers 56 and 57 to be lowered to the desired depth by lowering the frame 22 of the scraper 20 about the axis of the wheel means 24 and the drive motor means 78 is started to effect constant rotation of the cam shaft 70 in a counterclockwise direction as seen in FIGURES 4–7 whereby the fingers 56 and 57 are power driven in eccentric paths, approximately 180° out of phase, in the embodiment illustrated, so as to assist the forward draft motion of the self-loading scraper 20 in dislodging and loading earth or the like 102 being scraped and loaded. It will thus be understood that the eccentric movement of the assemblies 44 and 46 and particularly the load bed carrying member 42 will tend to constantly urge the earth 102 dislodged in a step-by-step manner up along the inclined load bed member 42 and toward the rear of the load carrying compartment of the self-loading scraper 20. Further considering FIGURES 4–7 and particularly FIGURE 4 it will be seen that the upper finger carrying assembly 46 is in its most forward position in relation to the center of the cam shaft 70 thus further illustrating how the scraper finger drive means crawls under the load, lifts it up and shakes it back. In FIGURE 5 it will be seen that the upper scraper finger carrying assembly 46 is in its uppermost position while the lower scraper finger carrying assembly 44 is in its lowermost position as it begins its forward travel. In FIGURE 6 it will be seen that the lower scraper finger supporting assembly 44 has moved to its most forwardly disposed position and is beginning to move upwardly and the upper scraper finger carrying assembly 46 is at its most rearwardly disposed position and is beginning to move downwardly and lastly in FIGURE 7 it will be seen that the lower finger carrying assembly 44 is moved to its uppermost position as it moves upwardly and rearwardly thus shaking the earth the fingers 56 have dislodged upwardly and rearwardly along the load bed member 42 as the fingers 57 of the upper finger carrying assembly 46 are moving downwardly and forwardly to take another bite into the earth 102. It will be understood that the cyclical motion of the fingers 56 and 57 is continuously effected during forward draft of the self-loading scraper 20 and in practice it has been found that the provision of the scraper finger drive means 40 reduces the power required to operate the self-loading scraper 20 by approximately 50% over the power required to operate a scraper of similar size and construction not equipped with the scraper finger drive means 40. Furthermore, earth working apparatuses provided with a series of scraping teeth operated by a cam means as disclosed herein, rather than a stationary scraper blade or non-eccentrically driven scraper blade, makes it possible to scrape and simultaneously load harder or more compacted earth in a more efficient manner than is normally possible with earth moving apparatuses provided hereinbefore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an earth working apparatus having a load receiving compartment and including a plurality of earth scraper teeth for dislodging earth to be loaded into the load receiving compartment, a power driven scraper teeth drive means to impart generally eccentric movement to the scraper teeth, said generally eccentric movement of the scraper teeth means being effected in a cyclic generally forward, upward, rearward and downward direction relative to the movement of the earth working apparatus to cause the scraper teeth means to bite into, lift and move rearwardly earth dislodged thereby, first teeth support means for supporting a first plurality of scraper teeth for said cyclic movement without relative movement between the teeth of said first plurality and with movement of said first plurality of teeth relative to the load receiving compartment and second teeth support means for supporting a second plurality of scraper teeth for said cyclic movement without relative movement between the teeth of said second plurality and with movement of said teeth of said second plurality relative to both said load receiving compartment and said first teeth support means.

2. In combination with a load receiving scraper supported by a portable frame for scraping and loading earth and having a loading opening, a first scraper tooth support means having one end pivotally secured to the frame of said load receiving scraper, power driven means for imparting forward, upward, rearward and downward cyclic movement of said scraper tooth support means relative to said frame, said power driven means being journaled to said frame, said first scraper tooth support means being journaled adjacent the other end to said power driven means, a second scraper tooth support means swingingly and pivotally secured adjacent one end to said first scraper tooth support means, said second scraper tooth support means being journaled adjacent its other end to said power drive means for forward, upward, rearward and downward cyclic movement relative to both said frame and said first scraper tooth support means, at least one scraper tooth carried by each of said first and second scraper tooth support means and generally extending across the loading opening, and a load bed means secured to said second scraper tooth support means for receiving earth scraped.

References Cited

UNITED STATES PATENTS

| 1,878,037 | 9/1932 | Vodoz | 37—141 XR |
| 1,919,075 | 7/1933 | Rasmussen | 37—141 XR |
| 2,245,544 | 6/1941 | Miller | 299—37 |
| 2,690,902 | 10/1954 | Ream | 37—141 |
| 2,777,680 | 1/1957 | Robb | 299—37 |
| 3,219,388 | 11/1965 | Haynes | 299—37 |
| 3,238,646 | 3/1966 | Oldenburg | 37—141 |
| 3,272,559 | 9/1966 | Haynes | 37—141 XR |
| 3,328,904 | 7/1967 | Voigt et al. | 37—142 |
| 3,387,890 | 6/1968 | Haynes | 299—37 |

EDGAR S. BURR, Primary Examiner

U.S. Cl. X.R.

299—37